United States Patent [19]

Fahl et al.

[11] 4,212,315

[45] Jul. 15, 1980

[54] SHROUD FOR PRESSURE VACUUM VENT

[75] Inventors: Richard L. Fahl, Cincinnati; Eugene B. Pemberton, Fairfield, both of Ohio

[73] Assignee: Dover Corporation, New York, N.Y.

[21] Appl. No.: 910,223

[22] Filed: May 30, 1978

[51] Int. Cl.² ............................................. F16K 17/18
[52] U.S. Cl. ................................. 137/377; 137/493.4; 220/85 P; 220/372
[58] Field of Search ..................... 137/377, 493, 493.4; 220/85 P, 372

[56] References Cited

U.S. PATENT DOCUMENTS

| | | | |
|---|---|---|---|
| 824,669 | 6/1906 | Moneuse | 137/377 |
| 2,781,941 | 2/1957 | Lindsay | 220/372 X |
| 4,007,759 | 2/1977 | Martin | 220/372 X |
| 4,103,705 | 1/1978 | Wagner | 220/203 X |

*Primary Examiner*—Robert G. Nilson
*Attorney, Agent, or Firm*—Kinney and Schenk

[57] ABSTRACT

A pressure vacuum vent has a body with means to vent an underground tank having vapors therein when the pressure within the tank exceeds a predetermined pressure and to allow ambient air pressure to enter the tank when the tank has a vacuum exceeding a predetermined vacuum. The body has a housing, which is open at its upper end, mounted thereon and extending upwardly therefrom with a cap mounted on top of the housing and spaced from the top of the housing to form passage means therebetween to allow vapor from the tank to flow upwardly therethrough. A cylindrical shaped shroud, which is preferably a single continuous member, is disposed in surrounding relation to the cap and the upper end of the housing to prevent any driven moisture from entering the passage means formed between the housing and the cap while still allowing vapor to flow only upwardly from the passage means through the shroud.

15 Claims, 3 Drawing Figures

SHROUD FOR PRESSURE VACUUM VENT

To prevent pollution of the atmosphere, underground storage tanks for gasoline have a pressure vacuum vent on the upper end of the vent pipe from the tank. This prevents escape of vapor from the tank unless the pressure in the tank exceeds a predetermined pressure so that there is not a continuous escape of vapor such as hydrocarbon emissions, for example, to the ambient. The pressure vacuum vent also enables the ambient pressure to enter the tank if the vacuum in the tank should exceed a predetermined vacuum.

If the pressure vacuum vent were not available and the tank was sealed to prevent pollution of the atmosphere, pressure in the tank could increase to cause rupture of the tank. Likewise, if the vacuum in the tank should increase beyond a predetermined vacuum, the tank could collapse because of the external crushing pressure of the land and any backfill. Therefore, it is necessary for any pressure vacuum vent on a vent pipe to be capable of maintaining the underground tank at a desired pressure condition in which its pressure does not increase beyond a predetermined pressure and any vacuum does not increase beyond a predetermined vacuum relative to the ambient.

It is necessary for the pressure vacuum vent to always vent the vapor upwardly for safety purposes. It also is necessary for the vapor to be vented upwardly under any atmospheric conditions including when freezing moisture such as freezing rain or sleet, for example, is occurring in order to comply with Code 30 of the National Fire Protection Association.

To prevent moisture from entering the tank through the pressure vacuum vent, a housing having an open upper end and a cap to substantially cover the open end of the housing have previously been provided. Passage means between the cap and the upper end of the housing enable the vapor to flow upwardly from the vent.

While the cap will normally prevent rain falling in a downward direction from entering the passage means between the cap and the housing, driven moisture such as rain, sleet, or snow, for example, can enter the passage means between the cap and the housing. Therefore, when freezing moisture is wind driven, it can either block these passage means and/or prevent one of the two valves in the pressure vacuum vent from opening to enable vapor to escape from the tank or the other of the two valves in the pressure vent from opening to allow ambient pressure to enter the tank. Thus, under freezing moisture conditions, the vapor cannot escape from the tank in some instances. As a result, there is not compliance with the requirements of Code 30 of the National Fire Protection Association.

The present invention satisfactorily solves the foregoing problem through providing a shroud to prevent driven moisture from entering the passage means between the cap and the housing while still allowing the vapor to flow only upwardly. Thus, the use of the shroud enables the presently available pressure vacuum vent to meet the requirements of Code 30 of the National Fire Protection Association.

An object of this invention is to provide a unique shroud for a pressure vacuum vent.

Another object of this invention is to provide a shroud for a pressure vacuum vent in which the vapor can always flow only upwardly under any condition.

A further object of this invention is to provide a shroud for a pressure vacuum vent to prevent driven moisture from entering the vent while allowing vapor to always flow only upwardly.

Other objects, uses, and advantages of this invention are apparent upon a reading of this description, which proceeds with reference to the drawings forming part thereof and wherein.

Figure 1:
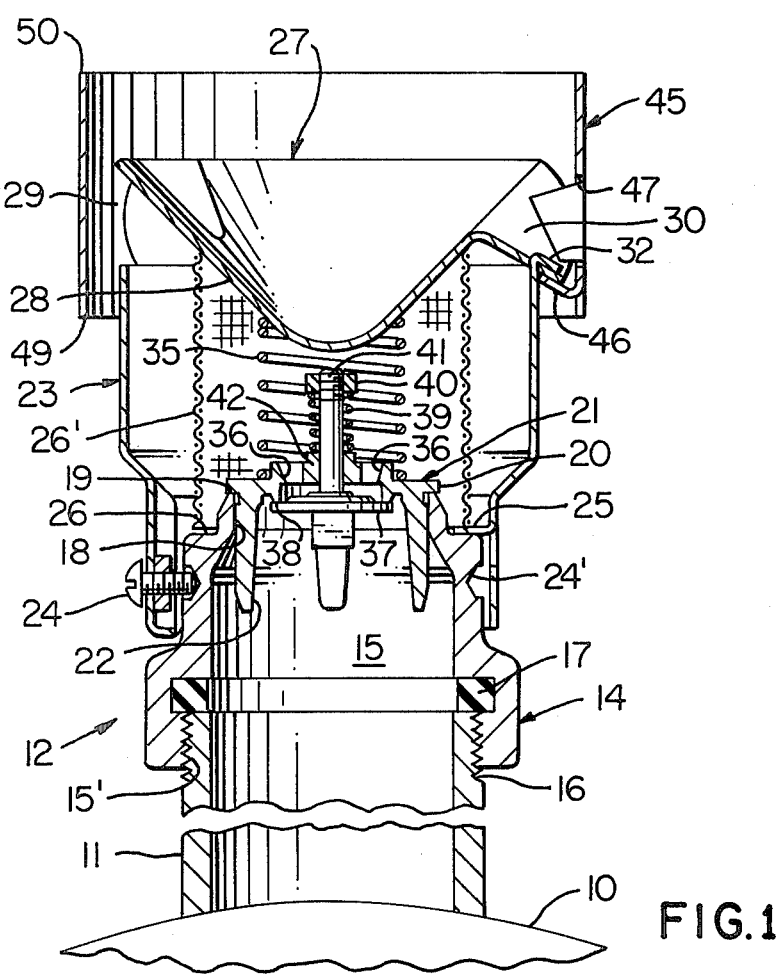
FIG. 1 is a sectional view, partly in elevation, of the shroud of the present invention mounted on a pressure vacuum vent and taken substantially along line 1—1 of FIG. 2.

Referring to the drawings and particularly FIG. 1, there is shown a portion of an underground storage tank 10 having a vent pipe 11 rising upwardly therefrom. It should be understood that the vent pipe 11 must extend upwardly above the ground in accordance with various safety requirements such that the top of the vent pipe 11 is above the top of any roof line, away from any electrical connection, and not adjacent any window or other area of escape from any building.

A pressure vacuum vent 12 is disposed on the upper end of the vent pipe 11 to prevent the escape of vapor from the tank 10 unless its pressure exceeds a predetermined pressure. The pressure vacuum vent 12 also allows ambient pressure to enter the tank 10 when the tank 10 has a vacuum exceeding a predetermined vacuum relative to the ambient.

The pressure vacuum vent 12 includes a hollow body 14 having a chamber 15 communicating with the tank 10 through the vent pipe 11. The body 14 has internal threads 15' for threading on external threads 16 on the upper end of the vent pipe 11. A gasket 17 is supported within the body 14 for engaging the upper end of the pipe 11 to form a seal therebetween.

The upper end of the hollow body 14 has a passage 18 surrounded by a circular seat 19 to provide communication from the tank 10 to the ambient through the chamber 15. The seat 19 has a circular shaped flange 20 of a pressure disc 21 in engagement therewith to seal the passage 18. The disc 21 has four legs 22 (two shown) extending through the passage 18 and into the chamber 15 of the body 14 to function as guides for the pressure disc 21 during movement of the pressure disc 21 relative to the body 14.

A cylindrical shaped housing 23 surrounds the upper portion of the body 14 and is secured to the body 14 by a pair of diametrically disposed screws 24 (one shown), which are mounted in the lower, smaller portion of the housing 23, engaging in a circumferential groove 24' in the housing 23. The housing 23 has three equally angularly spaced tabs 25 (one shown) extending inwardly for resting on an annular shoulder 26 on the body 14 to aid in positioning the housing 23 longitudinally relative to the body 14. The tabs 25 also space the housing 23 from the body 14 so that any moisture within the housing 23 can flow therebetween.

The tabs 25 also serve to support the bottom open end of a cylindrical shaped screen 26', which has its upper open end bearing against a dished portion of a cap 27. The cap 27 is supported on the upper end of the housing 23. Because the cap 27 is dished, surface 28 of the cap 27 extends at an angle to the upper end of the housing 23 to form passageways 29 therebetween.

The cap 27 has three equally angularly spaced gutters 30 at its periphery to provide three of the passageways 29 rather than a single continuous passageway. This is because the gutters 30 are bent downwardly to enable attachment of the cap 27 to the upper end of the housing 23 and to allow water to flow from the cap 27.

Figure 2:
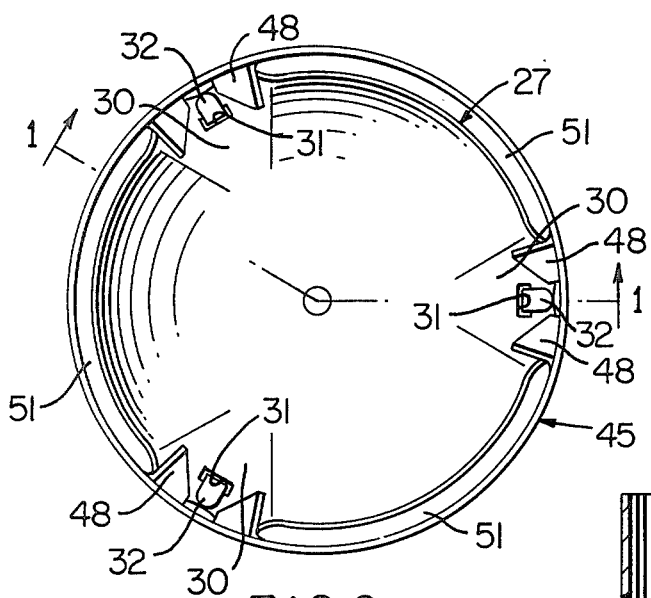
FIG. 2 is a top plan view of the shroud of the present invention mounted on the cap of the pressure vacuum vent of FIG. 1.

The cap 27 has a slot 31 (see FIG. 2) in each of the three gutters 30 to receive a tab 32 at the upper end of the housing 23. When each of the tabs 32 is passed through one of the slots 31 and bent down, the cap 27 is connected to the upper end of the housing 23.

The flange 20 of the pressure disc 21 engages the seat 19 on the body 14 due to gravity. To provide the desired pressure differential at which the pressure disc 21 moves upwardly when the pressure in the tank 10 exceeds the predetermined pressure so as to vent vapor from the tank 10, a spring 35 extends between the pressure disc 21 and the dished portion of the cap 27. The force of the spring 35 is selected so that the pressure disc 21 moves upwardly when the pressure in the tank 10 exceeds the ambient pressure by 0.5 p.s.i.

The pressure disc 21 has three passages 36 (two shown) extending therethrough to enable communication of the interior of the body 14 with the ambient with the pressure disc 21 in its closed position. A vacuum disc 37 engages a downwardly extending seat 38, which surrounds the passages 36, in the pressure disc 21 to close the passages 36.

The vacuum disc 37 is biased to its closed position by a spring 39, which acts between a nut 40 on the threaded end of a stem 41 and a central web portion 42, which is surrounded by the passages 36, of the pressure disc 21. The stem 41 is connected to the vacuum disc 37 and slidably supported within the central web portion 42 of the pressure disc 21.

The nut 40 is adjustable on the stem 41 to enable the force of the spring 39 to be set so that the vacuum disc 37 moves downwardly away from the seat 38 when the vacuum in the tank 10 exceeds the predetermined vacuum in comparison with the ambient pressure. That is, when the ambient pressure exceeds the pressure in the tank 10 by one-half ounce per square inch, the vacuum disc 37 moves away from the seat 38 to enable the ambient pressure to enter the tank 10.

Figure 3:
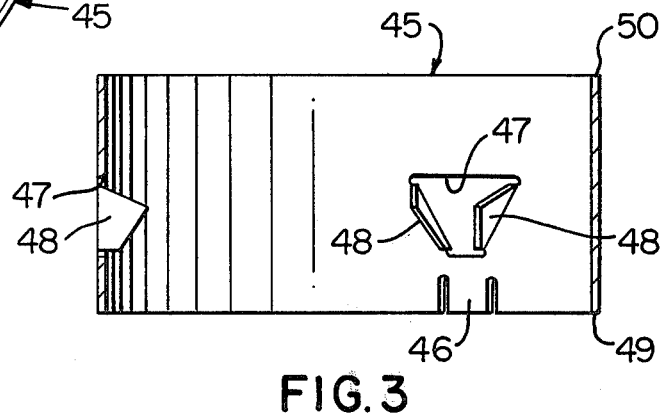
FIG. 3 is a sectional view of the shroud of the present invention prior to tabs, which engage the housing of the pressure vacuum vent, being bent inwardly.

A shroud 45, which is preferably cylindrical shaped and preferably formed of a single continuous piece of aluminum tubing, is mounted concentrically to the housing 23 through having three equally angularly spaced tabs 46 engaging the outer surface of the housing 23 adjacent the upper end. The shroud 45 has three openings 47, which are equally angularly spaced, formed therein with each of the openings 47 being disposed above one of the tabs 46 as shown in FIG. 3.

Each of the openings 47 has a pair of tabs 48 (see FIG. 2) extending inwardly therefrom for disposition within one of the gutters 30 in the cap 27. This allows any water within the cap 27 to flow from the gutters 30 through the openings 47 when the water in the cap 27 reaches the level of the gutters 30.

Because each pair of the tabs 48 rests in one of the gutters 30, they cooperate with the tabs 46, which are disposed beneath the lower portions of the gutters 30 exterior of the housing 23, to connect the shroud 45 to the cap 27. That is, the shroud 45 is held on the cap 27 by each of the tabs 46 being disposed beneath one of the gutters 30 and the tabs 48 being disposed in the gutters 30 in the cap 27.

The shroud 45 has its lower end 49 disposed beneath the upper end of the housing 23 for a sufficient distance to prevent driven moisture from entering the three passageways 29, which are formed between the upper end of the housing 23 and the cap 27. The shroud 45 has its upper end 50 disposed a greater distance above the upper end of the cap 27 than its lower end 49 is disposed beneath the upper end of the housing 23. This is because the angle of the dished portion of the cap 27 would permit driven moisture to more easily enter the passageways 29 adjacent the upper end of the cap 27 than adjacent the upper end of the housing 23. Thus, the shroud 45 extends sufficiently above the upper end of the cap 27 and sufficiently below the upper end of the housing 23 to prevent any driven moisture from entering the passageways 29.

Additionally, the extension of the shroud 45 above the upper end of the cap 27 for a sufficient distance insures that the vapor flows only upwardly from the passageways 29 through the shroud 45. That is, the wind cannot cause the vapor to flow downwardly from the passageways 29 through the passageways defined between the lower end 49 of the shroud 45 and the housing 23. Thus, a chimney effect is obtained from the shroud 45 to enable the vapor to flow upwardly.

The vapor flows upwardly from the three passageways 29 through three passageways 51 (see FIG. 2), which are formed between the upper, outer end of the cap 27 and the shroud 45. The total area of the three passageways must be equal to or greater than the area of the passageways 29 (see FIG. 1) so that there is no retarding of the vapor flow. Likewise, the area of the passageways 29 must be equal to or greater than the area of the passage 18 so that there is no retarding of the vapor flow. Otherwise, the vapor would not flow upwardly as is required by Code 30 of the National Fire Protection Association.

Since the passages 36 have a substantially smaller cross sectional area than the passage 18, the area of the passageways 51 (see FIG. 2) is larger than the total area of the three passages 36 (see FIG. 1) as is the area of the passageways 29. Thus, there is no restriction on ambient pressure entering the tank 10 when the pressure disc 37 moves away from the seat 38.

It is necessary that the shroud 45 extend sufficiently upwardly and downwardly with respect to the passageways 29 that no driven moisture can enter therebetween while still insuring that the vapor flows only upwardly. Thus, the length of the shroud 45 is selected to meet this requirement. Similarly, the diameter of the shroud 45 is selected so that the area of the passageways 51 is equal to or greater than the area of the passageways 29 but not to a sufficient extent. That is, it is desired for the area of the passageways 51 to be only slightly larger than the area of the passageways 29 if not equal thereto.

An advantage of this invention is that it insures that a pressure vacuum vent is not blocked by freezing moisture. Another advantage of this invention is that it insures that the vapor from a tank flows only upwardly.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. In combination, a body mounted on the upper end of a riser pipe of an underground storage tank, said body having first means to vent vapor from the tank when pressure in the tank exceeds a predetermined pressure and second means to allow ambient pressure to enter the tank when the tank has a vacuum therein exceeding a predetermined vacuum, a housing supported on said body and having an open upper end, a cap supported on said housing and cooperating therewith to substantially enclose said first and second means, said cap being spaced from the open end of said housing to form a passage means therebetween of an area not to retard vapor flow, and a shroud extending above the top of said cap and beneath the top of said housing to prevent driven moisture from entering said passage means while allowing upward vapor from said first means and said passage means.

2. The combination according to claim 1 in which said shroud comprises a cylindrical shaped member, said cylindrical shaped member extending further above the upper end of said cap than below the upper end of said housing.

3. The combination according to claim 2 including means to concentrically space said cylindrical shaped member from said enclosing means.

4. The combination according to claim 1 in which said shroud comprises a cylindrical shaped member, said cylindrical shaped member extending further above said cap than below the top of said housing.

5. The combination according to claim 4 including means to concentrically space said cylindrical shaped member from said housing.

6. The combination according to claim 5 including means to connect said cylindrical shaped member only to said cap.

7. The combination according to claim 6 in which said cylindrical shaped member has means to allow water to drain from said cap to the exterior of said cylindrical shaped member.

8. The combination according to claim 5 in which said housing is disposed in surrounding relation to said first and second means of said body.

9. The combination according to claim 4 including means to connect said cylindrical shaped member only to said cap.

10. The combination according to claim 9 in which said cylindrical shaped member has means to allow water to drain from said cap to the exterior of said cylindrical shaped member.

11. A device for preventing driven moisture from entering an underground storage tank, comprising:
(a) an underground storage tank;
(b) a venting conduit extending upwardly from the storage tank with an opening to the atmosphere for selectively providing fluid communication therebetween;
(c) a first normally closed pressure responsive valve disposed in the venting conduit selectively operative to close at least one fluid passage in the venting conduit between the storage tank and the atmosphere, said first valve being pressure responsive to open whenever pressure within the tank exceeds atmospheric pressure by a predetermined magnitude;
(d) a second normally closed pressure responsive valve disposed in the venting conduit selectively operative to close at least one other fluid passage in the venting conduit between the storage tank and the atmosphere, said second valve being pressure responsive to open whenever atmospheric pressure exceeds the pressure in the tank by a predetermined magnitude;
(e) a cap associatively fitted with respect to the venting conduit opening, the cap being at least partially above and extending horizontally beyond the lateral extremities of the venting conduit opening; and
(f) a shroud fixedly secured relative to the cap, the shroud having sidewalls laterally spaced with respect to the venting conduit opening and extending vertically above the top of the cap and vertically below the venting conduit opening to prevent entry of driven moisture.

12. A device as recited in claim 11 further including means for draining water from the cap to the exterior of the shroud.

13. A device as recited in claim 11 wherein the venting conduit includes a riser pipe and a housing attached to the end of the riser pipe distal to the storage tank.

14. A device as recited in claim 11 wherein the cap has a central dished portion disposed beneath the vent opening and side portions extending angularly upward from the central dished portion to a location which is above and laterally disposed with respect to the vent opening to form a flow passage between the underside of the cap and the upper end of the venting conduit.

15. A device as recited in claim 14 wherein the shroud includes a cylindrical shaped member circumferentially disposed about the upwardly extending side portions of the cap to form a flow passage therebetween.

* * * * *